United States Patent [19]

Pearman

[11] 4,271,694
[45] Jun. 9, 1981

[54] SYSTEM FOR IN SITU METER TESTING

[76] Inventor: A. Noel J. Pearman, 2087 Bayard Ave., St. Paul, Minn. 55116

[21] Appl. No.: 123,585

[22] Filed: Feb. 22, 1980

[51] Int. Cl.³ ............................................. G01F 25/00
[52] U.S. Cl. ............................................ 73/3; 73/201
[58] Field of Search ................................... 73/3, 201

[56] References Cited
U.S. PATENT DOCUMENTS

| | | | |
|---|---|---|---|
| 2,579,656 | 12/1951 | Douglas et al. | 73/201 |
| 3,444,724 | 5/1969 | Gilpin | 73/201 |

Primary Examiner—S. Clement Swisher
Attorney, Agent, or Firm—C. G. Mersereau

[57] ABSTRACT

A system for in situ testing of fluid meters is disclosed in which two 4-way valves utilized in combination with a by-pass line such that with the valves in a first position, all the supplied fluid flows through the meter and, in the alternate position, the entire flow of fluid is through the by-pass system completely isolating the meter. In addition, one port of each valve leads to a test connection which is in line with the meter when the valves are in the alternate or by-pass position. This effectively removes the meter from the line and allows test equipment to be connected across the meter for calibration, verification, or other tests to be performed. The valves are preferably designed to operate in unison and such that during position switching, flow is initiated in accordance with the position to which the valve is being switched before flow in accordance with the original position is terminated.

6 Claims, 2 Drawing Figures

U.S. Patent   Jun. 9, 1981   4,271,694

SYSTEM FOR IN SITU METER TESTING

CROSS-REFERENCE TO RELATED APPLICATION

Reference is made to a related application Ser. No. 123,584 by Asbjorn M. Severson entitled "System for In Situ Meter Testing," filed of even date and assigned to the same assignee as the present invention. That invention contemplates a re-routing of the entire flow of gas downstream of the gas meter through test equipment. The gas may then be returned to the line of the user or stored or vented, in which case an alternate supply of gas is used to maintain service to the user while calibration or other testing is being accomplished.

The present invention, on the otherhand, contemplates two 4-way valves and a by-pass line utilized in conjunction with a meter such that with the valves in one position, all the supplied gas flows through the meter and, in the alternate position, the entire flow of gas is through a by-pass system completely isolating the meter. This allows the meter to be calibrated through test ports by portable equipment without interrupting the flow of gas to the user. Thus, this invention contemplates a complete by-pass of the meter to be calibrated during the calibration sequence.

BACKGROUND OF THE INVENTION

1. Field of the Invention

The present invention relates generally to the calibration of fluid meters and, more particularly, to a system to permit in situ calibration of small gas meters such as residential gas meters.

2. Description of the Prior Art

In the prior art, large commercial or industrial gas meters have conventionally been provided with test ports in the meter which are accessible for calibration and verification of the meter while the meter is still in service. However, small capacity meters such as those associated with residential installations have not been provided with any means of calibrating the meters while in use. In order to calibrate the conventional residential or other small gas meter, it has heretofore been necessary to remove the meter from the line, replace it with a previously calibrated meter, and to conduct the meter testing at a remote location. This has been done on a regularly scheduled basis, for example, every five years, by most gas utility companies at great expense. Many of these meters have needed only a simple verification or minor adjustment which could easily have been accomplished if the meter could have been checked in situ without interruption of the gas supply to the customer.

Ultrasonic flow measurement is one approach that has been tried successfully for the measure of liquid flow in regard to verifying or calibrating liquid meters. However, because of power transmission losses at the boundary layer in gaseous flow, the technique of attaching ultrasonic probes to the gas pipes introduces errors which have not allowed this technique to be used successfully in that regard. Thus, there exists a definite need for the ability to verify and calibrate a relatively small gas meter such as a residential gas meter in situ without interruption of the gas flow to the consumer.

SUMMARY OF THE INVENTION

According to the present invention, the problem associated with the calibration of small capacity gas meters in situ has been solved by the provision of the unique valving system which, in conjunction with a portable calibration system, can be used to calibrate the meter without interruption of the flow of gas to the user. This system includes two, 4-way, dual-position valves, one located on each side flanking the meter in the supply line. In addition to the two ports connecting each valve in the supply line, one port of each valve leads to a test connection and the remaining port of each valve is connected by a common by-pass line. A conventional valve operator is connected so as to operate the valves in unison such that in a first or normal operating position, the gas flows through both valves and the meter along the supply line; and in a second or test position the gas flow is maintained to the user through the by-pass line and the meter is connected across the test ports. This takes the meter out of the line and allows test equipment to be connected across the meter for calibration, verification, or other tests to be performed. The valves are preferably designed so that during position switching, flow is initiated in accordance with the position to which the valve is being switched before flow in accordance with the original position is cut off. This assures continued service to the user and pre-urging of all lines before connection.

BRIEF DESCRIPTION OF THE DRAWINGS

In the drawings wherein like numerals are utilized to designate like parts throughout the same.

DESCRIPTION OF THE PREFERRED EMBODIMENT

In accordance with the present invention, there is provided a method and apparatus for facilitating the testing of a conventional gas meter without removal of the meter from the line or the interruption of service to the user. A system which can be used in accordance with the present invention is illustrated in FIGS. 1 and 2.

Figure 1:
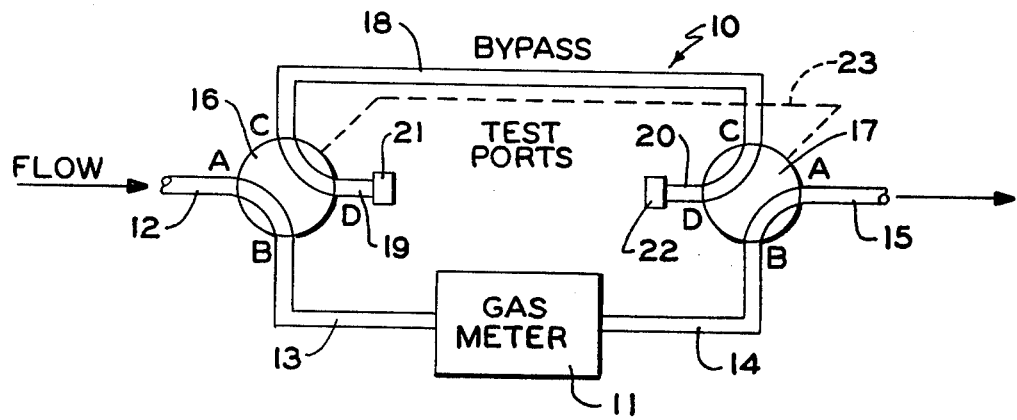
FIG. 1 is a schematic diagram of a system for in situ meter testing showing the valves in the normal or operating position.

Thus, in FIG. 1, there is shown generally at 10 a schematic diagram of a system in accordance with the present invention. This system includes a gas meter 11, gas supply pipe having sequential segments denoted by 12, 13, 14, and 15, 4-way valves 16 and 17 having ports denoted by A, B, C, and D. A by-pass line 18 is provided to connect ports C of both valve 16 and valve 17. Ports D of valves 16 and 17 are connected to test ports 19 and 20 respectively. Seals or caps 21 and 22 are also provided. The common operator 23 is utilized to switch positions of both valves 16 and 17 simultaneously.

In FIG. 1, the system is shown in the normal or operating position wherein the gas meter is connected serially in the fuel supply line. The valves 16 and 17 are positioned such that fuel flows through the valves between the A and B ports thus maintaining a continuous supply. In this position, the by-pass line 18 is separated from the fuel and connected to the test or sample ports 19 and 20 by the C and D ports of the valves 16 and 17. In this position, the by-pass system is in the dormant mode and the test ports 19 and 20 are normally kept capped or sealed as at 21 and 22 to prevent ingress of foreign materials to the system.

Figure 2:
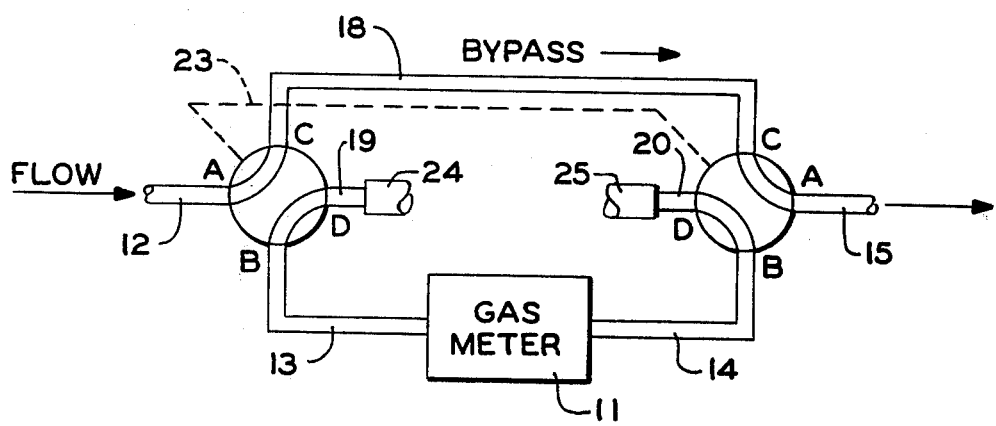
FIG. 2 is the schematic diagram of FIG. 1 with the valves in the in situ testing position.

FIG. 2 shows the alternate or test position of the valves 16 and 17 in which the fuel gas flows along the route including ports A and C in the system which connects the fuel line with the by-pass line to maintain continued supply to the user. The gas meter, on the other hand, is now in the test position connected to the test ports 19 and 20 and flow through the meter is accomplished by the connection of ports B and D of the valves 16 and 17. Thus, a testing system of any desired type may be connected in series with the gas meter as at 24 and 25 and the meter can thereby be tested without removal and without interruption of service to the user as the main fuel flow is maintained by the by-pass line 18.

The valves 16 and 17 may be commercially available valves such as Model MPD13-52 4-way ball valves manufactured by Pittsburgh Brass Manufacturing Co. of Irwin, Pa., and the seals or caps 21 and 22 for the ports 19 and 20 may be conventional screw-on pipe caps or quick disconnect fittings or the like may be provided in a well-known manner. Also, the dual simultaneous operation of the valves may be accomplished simply by a mechanical linkage between the conventional handles utilized to rotate the valves or both valves may be or a common stem or other appropriate means well known in the art may be used.

In addition, a lock may be provided such that only the utility or person authorized to conduct the tests has the ability to switch the gas flow to the by-pass line so that customers cannot do so on their own. One method, of course, is to have the entire mechanism for rotating the valves removable such that only those persons actually testing the meters are provided with the necessary tools to rotate the valves.

It should also be noted that the entire assembly may be mounted inside the case of the gas meter. This, of course, would allow the utility to maintain locked meter cases to prevent tampering.

It can readily be seen from the above that the system of the invention provides a simple in situ method and apparatus for alleviating the problems associated with the necessity of removing gas meters from the line in order to accomplish verification, calibration, or other necessary periodic tests to assure the accuracy of the meter.

The embodiments of the invention in which an exclusive property or right is claimed are defined as follows:

1. A method for in situ testing of fluid to flow meters comprising the steps of:
    providing a pair of 4-way, dual-position valve means in fluid supply line flanking said meter;
    providing a common by-pass line connecting one port of each of said valves;
    providing an outlet test port at the remaining port of each of said valves;
    maintaining said valves in a first position whereby flow is normally established along said fluid supply line through said meter;
    simultaneously switching said valves to a second position whereby said flow is established along said supply line through said by-pass and said meter is connected across said test ports when it is desired to test said meter;
    returning said valves to said first position upon completion of said testing.

2. Apparatus for in situ testing of a fluid meter in a fluid supply line comprising:
    a pair of 4-way, dual-position valves disposed in said fluid supply line flanking said meter;
    a common by-pass line connecting one port of each valve;
    a test port on each valve adapted to be connected to a test device;
    valve operating means for switching the position of said valves between said dual positions such that in a first position the flow is through both valves and the meter with the by-pass line isolated; and a second position the flow is through the by-pass line and the meter is isolated but connected across said test ports.

3. The apparatus of claim 2 wherein said valves are switched simultaneously.

4. The apparatus of claim 2 wherein said valve connections are such that during switching flow is initiated in accordance with the position to which the valves are being switched before it is terminated in accordance with the former position.

5. The apparatus of claim 2 further comprising closure means for closing said test ports when not in use.

6. The apparatus of claim 2 wherein said pair of valves are located within the meter case.

* * * * *